Figure 6:
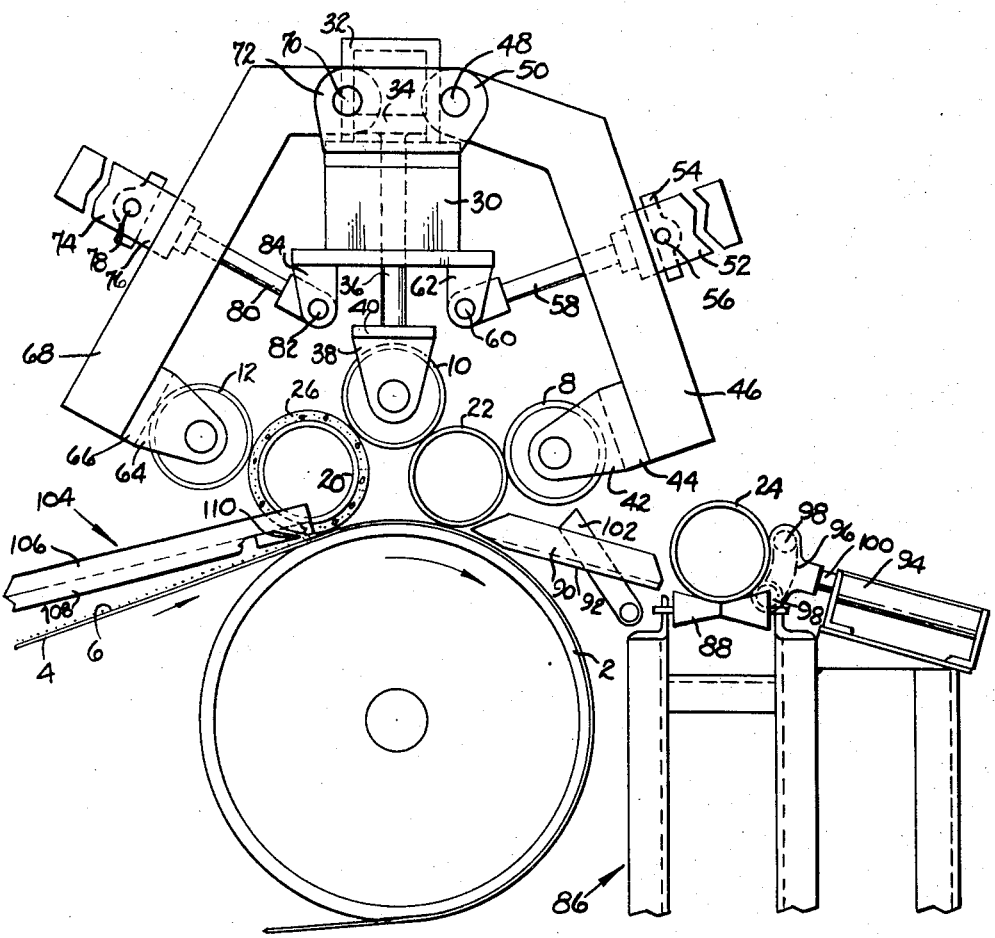

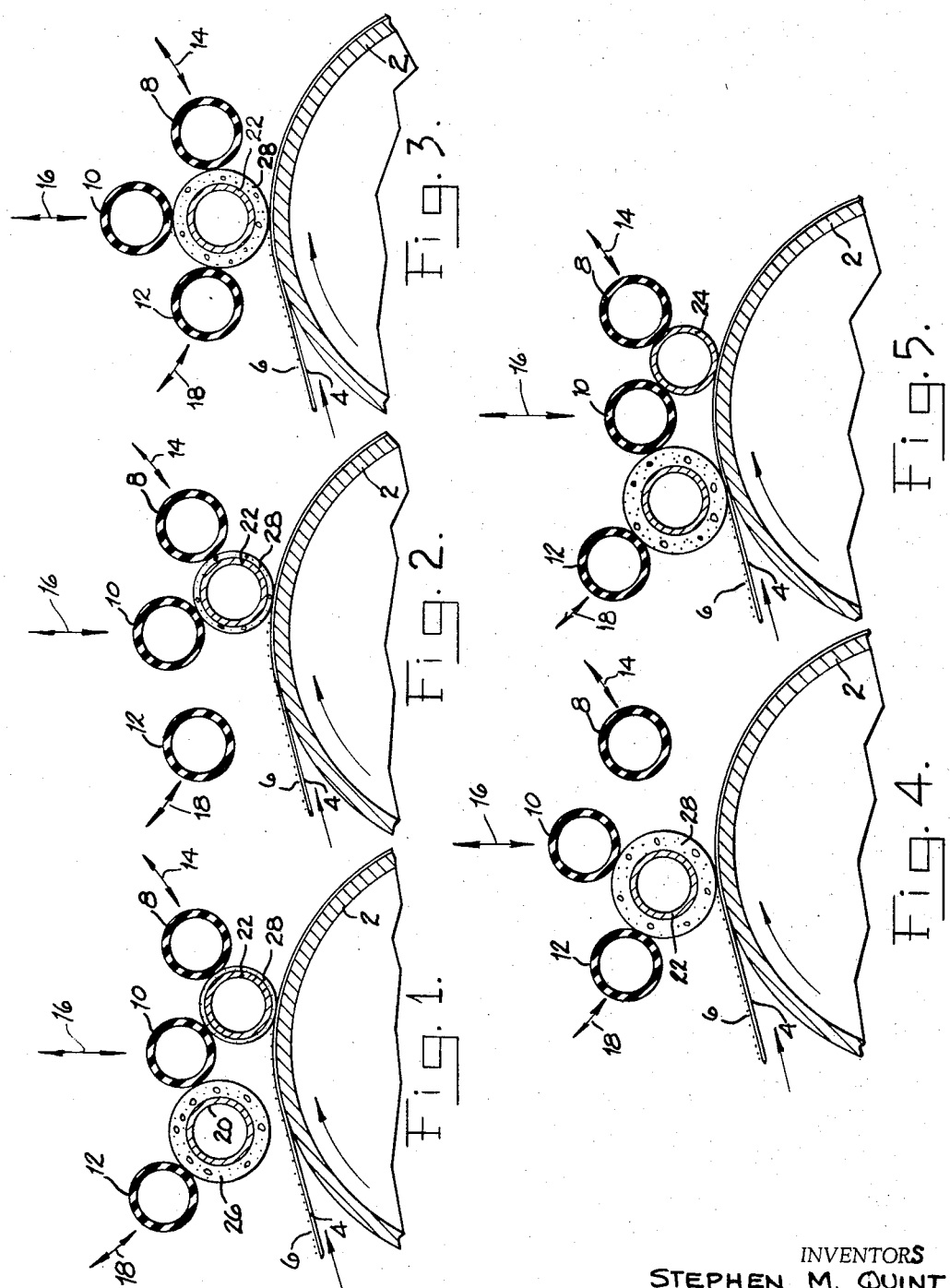

INVENTORS
STEPHEN M. QUINT
ROBERT H. ADAMS

United States Patent Office 3,369,066
Patented Feb. 13, 1968

3,369,066
METHOD AND APPARATUS FOR MANUFAC-
TURING OF ASBESTOS-CEMENT
Stephen M. Quint, Orange, and Robert H. Adams, Somer-
ville, N.J., assignors to Johns-Manville Corporation,
New York, N.Y., a corporation of New York
Filed Feb. 17, 1964, Ser. No. 345,165
9 Claims. (Cl. 264—160)

This invention relates to method and apparatus for the manufacture of articles which are formed on a mandrel and more particularly is directed to the manufacture of asbestos-cement pipe from an asbestos-cement stock which is wound around a mandrel. More specifically, the invention is directed to the manufacture of asbestos-cement pipe from an asbestos-cement stock carried by a continuously moving endless conveyor and from which asbestos pipes may be formed without interruption of the movement of the conveyor. While the invention is described particularly with reference to the formation of asbestos-cement pipe, it is understood that the invention is applicable in principle to other articles similarly formed on a mandrel.

One conventional method of forming asbestos-cement pipe involves depositing a stock of asbestos-cement pulp on an endless conveyor to form a substantially continuous sheet thereon and winding the sheet of asbestos-cement stock on a rotating hollow mandrel while applying high pressure thereto. The sheet is wound on the mandrel by positioning the mandrel between an anvil roll, around which is trained the endless conveyor, and a pair of rotatable press rolls. The anvil roll is rotated causing the movement of the endless conveyor and rotation of the mandrel so as to laminate thereon the sheet of asbestos-cement stock. It has been found in the commercial production of asbestos-cement pipe that it is desirable for the mandrel, on which the asbestos-cement pipe is to be formed, to initially contact the surface of the endless conveyor on which there is no asbestos-cement stock, and the formation of the pipe is commenced by moving the endless conveyor so as to cause the asbestos-cement stock to contact the surface of the mandrel and to be laminated thereon. When a pipe of suitable wall thickness has been formed, the movement of the endless conveyor is stopped, the mandrel with the pipe formed thereon is removed, and a new mandrel is positioned between the anvil roll and the press rolls. The movement of the conveyor is again started and the foregoing cycle is repeated. This repeated stopping and starting of the endless conveyor presents a problem in the commercial production of pipe because of the loss of production time occasioned by the stopping and starting plus the time lost for the changing of the mandrels. Also, the stopping of the conveyor causes the formation of uneven deposits of the asbestos stock on that portion of the conveyor belt in the mixing vats or cylinder mold. Also, the repeated stopping and starting of the endless conveyor increases the wear on the various operating mechanisms of the system resulting in increased maintenance costs.

It is an object of the instant invention to provide method and apparatus for the manufacture of asbestos-cement pipe on a plurality of mandrels from an asbestos-cement stock carried by a moving endless conveyor without stopping the movement of the endless conveyor between the formation of pipe on successive mandrels.

It is another object of the instant invention to provide method and apparatus for the formation of asbestos-cement pipe from an asbestos-cement stock carried by a continuously moving endless conveyor wherein each successive empty mandrel initially contacts a portion of the endless conveyor which carries no asbestos-cement stock.

The foregoing objects are accomplished in accordance with the instant invention by method and apparatus wherein an anvil roll over which is trained an endless conveyor on which is deposited a substantially continuous sheet of asbestos-cement stock cooperates with a plurality of press rolls to wrap portions of said sheet of asbestos-cement stock around a plurality of mandrels. In the preferred embodiment of the invention, the press rolls comprise three rolls each of which is mounted for rotational movement on supports which are guided for movement toward and away from the peripheral surface of the anvil roll so that the press rolls may move into and out of contact with the peripheral surface of the laminations of asbestos-cement stock on the mandrel. In operattion, an endless conveyor carrying asbestos-cement stock is trained over an anvil roll. An empty first mandrel is positioned in contact with the endless conveyor and between the anvil roll and a first and second press roll and wherein the peripheral surface of the first mandrel contacts the endless conveyor and the peripheral surface of the press rolls. The anvil roll is rotated causing movement of the endless conveyor and rotation of the first mandrel and the press rolls. The asbestos-cement stock on the endless conveyor moves into contact with the peripheral surface of the first mandrel and adheres thereto and begins to form laminations of asbestos-cement on the mandrel. The first and second press rolls exert pressures on the asbestos-cement laminated on the first mandrel so as to bond these laminations to the first mandrel. As the laminations are being formed on the first mandrel the second press roll moves generally in a direction away from the peripheral surface of the anvil roll while the first press roll moves generally in a direction toward the surface of the anvil roll. This relative movement of the first and second press rolls while in contact with the laminations of asbestos-cement being formed on the first mandrel causes the movement of the first mandrel generally in an arcuate direction over the surface of the endless conveyor as it is trained around the anvil roll and in a direction opposite to the direction of movement of said endless conveyor and the direction of rotation of said anvil roll. This movement of the first mandrel is continued until contact is established between the peripheral surface of a third press roll and the laminations of asbestos-cement on the first mandrel. After this contact has been made, the second press roll begins to move generally in a direction toward the peripheral surface of the anvil roll and the third press roll moves generally in a direction away from the peripheral surface of the anvil roll. At this time, the first press roll is no longer in contact with the laminations of asbestos-cement on the first mandrel. It is to be understood that the press rolls during their movement are at all times exerting pressures on the laminations of asbestos-cement stock being made on the mandrels. While the first mandrel is positioned between the anvil roll and the second and third press rolls, the first press roll is moved in a direction away from the surface of the anvil roll so as to allow sufficient room for the insertion of a second mandrel at the proper time. The movement of the first mandrel generally in the arcuate direction is continued until the laminations on the first mandrel have reached a thickness equal to the wall thickness of the pipe which is being manufactured. During the formation of the final laminations on the first mandrel, a second mandrel is positioned between the anvil roll and the first and second press rolls so as to begin the formation of another pipe. The first mandrel with the pipe formed thereon is moved generally in a direction away from the anvil roll and the web of asbestos-cement stock between asbestos-cement stock on the endless conveyor and the asbestos-cement stock in the laminations on the first mandrel is broken. The new end of the asbestos-cement stock on the endless conveyor is then moved into contact with the second mandrel positioned between the anvil roll and the first and second press rolls and the cycle is repeated. Thus, in accordance with the method and apparatus of the instant invention, it is not necessary to stop the movement of the endless conveyor to remove the first mandrel with the pipe formed thereon and to insert a second mandrel. Therefore, asbestos-cement pipes may be formed successively on a plurality of mandrels in a continuous operation.

Figure 7:
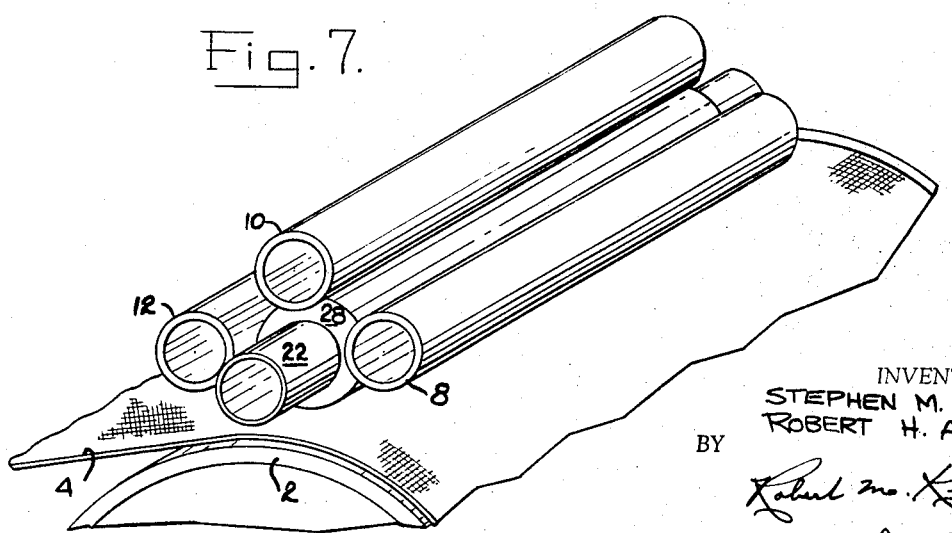

The invention will be more fully understood and further objects and advantages thereof will become apparent when reference is made to the following detailed description of a preferred embodiment of the invention and the accompanying drawing in which:

FIGS. 1–5, inclusive, are schematic illustrations of the relative positions of the press rolls and mandrels during the formation of pipe on the mandrels in accordance with the concepts of the instant invention;

FIG. 6 is a schematic illustration of apparatus which may be used in carrying out the inventive concepts of the instant application; and FIG. 7 is a pictorial representation of the formation of pipe generally at the relative position indicated in FIG. 3.

Referring to the drawing, there is illustrated in FIGS. 1–5, inclusive, an anvil roll 2 over which is trained an endless conveyor 4 which is arranged to pick up a wet laid stock 6 of asbestos-cement from a cylinder mold or molds (not shown) of a conventional machine such as the type shown in Rembert, U.S. Patent No. 2,322,592. The anvil roll 2 also is of the type shown in the aforesaid Rembert patent and comprises a rigid element capable of withstanding pipe forming pressures without flexing and is rotated by a conventional means (not shown) to move the endless conveyor 2 in a direction shown by the arrow. Positioned above the anvil roll are a plurality of press rolls 8, 10 and 12. Each press roll is mounted for rotational movement in conventional supports (not shown) which are in turn mounted in conventional means (not shown) and move generally along the paths indicated by the lines 14, 16 and 18. Each press roll 8, 10 and 12 may extend the full width of the machine or it may comprise a plurality of individual rolls mounted on a common shaft and the total width of the combined individual rolls will be commensurate with the full width of the machine. In the preferred embodiment of the invention, each press roll 8, 10 and 12 has a steel core and a peripheral surface formed of a resilient material such as neoprene or other rubberlike material preferably of a hardness in the order of 55 durometer. The peripheral surfaces of these rolls are roughened to provide a surface having a multiplicity of lands and valleys as disclosed in Swensen, U.S. Patent No. 3,000,776. It will be understood, however, that the roll need not be of composite construction. Thus, for example, the roll may be substantially solid with an integral peripheral portion, and the peripheral portion may be formed of any material having sufficient strength and resistance to wear to withstand the forces of pipe formation. Within these limitations of strength and resistance to wear, the peripheral portion of a composite roll construction may be of any thickness.

In FIGS. 1–5, inclusive, there are illustrated a plurality of mandrels 20, 22 and 24 which are shown in various stages during the formation of a pipe thereon by the lamination on the peripheral surface thereof of laminations of the asbestos-cement stock 6 carried by the endless conveyor 4. In FIG 1, the mandrel 20 has a pipe 26 fully formed thereon and is in the process of being removed from the system. At the same time, the mandrel 22 is between the anvil roll 2 and the press rolls 8 and 10 and laminations 28 of the asbestos-cement stock 6 are being formed on the surface thereof. In FIG. 2, the thickness of the laminations 28 has increased and the press roll 8 has moved along the path 14 in a direction toward the surface of the anvil roll 2 while the press roll 10 has moved along the path 16 in a direction away from the surface of the anvil roll 2. This relative movement of the press rolls 8 and 10 together with the increased thickness of the laminations 28 has moved the relative position of the mandrel 22 on the surface of the anvil roll 2 through an arcuate distance and in the direction opposite to the direction of movement of the endless conveyor 6 and the anvil roll 2. During the relative movement of the press rolls 8 and 10 and the mandrel 22, the mandrel 20 with the pipe 26 formed thereon has been removed from the system and the press roll 12 has moved back along the path 18 toward the anvil roll 2 so as to be in position to aid in the formation of the laminations 28 on the mandrel 22. In FIG. 3, the relative movement of the press rolls 8 and 10 and the mandrel 22 has continued until the laminations on the mandrel 22 are now in contact with the peripheral surface of the press roll 12. In FIG. 4, the mandrel 22 has moved to a new position where it is between the anvil roll 2 and the press rolls 10 and 12 and the thickness of the laminations 28 has increased further and the press roll 10 is moving along the path 16 in the direction toward the surface of the anvil roll 2 while the press roll 12 is moving along the path 18 in a direction away from the surface of the anvil roll 2. The movement of the press rolls has continued to move the mandrel 22 in the arcuate path in the direction opposite to the direction of movement of the endless conveyor 4 and the direction of rotation of the anvil roll 2. At the same time, the press roll 8 has been moved along the path 14 in a direction away from the anvil roll 2. In FIG. 5, the relative movement of the press rolls 10 and 12 and the mandrel 22, as described in relation to FIG. 4, is continuing and the thickness of the laminations 28 on the mandrel 22 is increasing and in fact, the thickness of the laminate on the mandrel 22 has almost reached its final thickness. Another new mandrel 24 has been inserted into the system. The new mandrel 24 has been moved into contact with the surface of the endless conveyor 4 over the anvil roll 2 while the laminations 28 are still being formed on the mandrel 22. The press rolls 8 and 10 are moved toward the anvil roll 2 until the surfaces of the press rolls 8 and 10 contact the surface of the mandrel 24. The new mandrel 24 is now in position so that the formation of the laminations of asbestos-cement may begin thereon. The mandrel 22 is moved in a direction away from the anvil roll 2 and the web of asbestos-cement between the stock 6 on the endless conveyor 4 and the laminations 28 on the mandrel 22 is broken. The new end of the asbestos-cement stock 6 then moves with the endless conveyor 4 until it reaches the mandrel 24 and begins the formation of the laminations of asbestos-cement thereon in the manner set forth above.

In the foregoing explanation of FIGS. 1–5, inclusive, and subsequently in FIGS. 6 and 7, the movement of the press rolls 8 and 12 is described in relationship to arcuate paths 14 and 18. However, it is to be understood that this is for explanation purposes only and it is entirely within the scope of this invention, that the press rolls 8, 10 and 12 may be moved in a linear path or any other type of path as long as they function to apply pressure on the laminations of asbestos-cement on the mandrels and cooperate with the movement of the mandrels through the system.

The operation of the subject matter of the instant invention has been clearly set forth above in the description of FIGS. 1–5, inclusive, of the invention. The speed of movement of a mandrel through the system is determined by the size of the mandrel, the speed of the endless conveyor, the thickness of the asbestos-cement stock on the endless conveyor and the wall thickness of the pipe to be formed. The pressures applied by the press rolls 8, 10 and 12 may also be varied throughout the formation of the asbestos-cement pipe on the mandrel and these pressures depend on the type of pipe which is being formed. In the preferred embodiment of the invention, the pressure applied by the press rolls 8, 10 and 12 will be varied as desired between about 50 and 300 pounds per line inch of pipe. Also, pipes of varying lengths may be formed on the apparatus. The length of the pipe being formed depends upon the width of the endless conveyor and more specifically on the width of the wet asbestos-cement stock deposited thereon. It is conventional practice to form asbestos-cement pipe in lengths of either 10 or 13 feet and having diameters from about 2 to 36 inches and wall thicknesses from about ¼ to 3 inches. However, it is understood that the foregoing dimensions are given for illustration purposes only and that invention is not to be limited thereto. The various lengths of asbestos-cement pipe are generally obtained by regulating the width of the asbestos-cement stock on the endless conveyor by blanking off appropriate portions of the cylinder mold in that section of the apparatus.

From the foregoing explanation of the instant invention, it is evident that applicants have provided a system for the formation of asbestos-cement pipe on a mandrel wherein it is possible to form pipe continuously from an asbestos-cement stock carried by a moving endless conveyor wherein it is not necessary to stop the movement of the endless conveyor between the formation of pipe on successive mandrels. Also, applicants have provided a system for the continuous formation of pipe wherein the new mandrel may be always placed onto a portion of the endless conveyor where there is no asbestos-cement stock and the formation of the pipe may be commenced by moving the asbestos-cement stock into contact with the new mandrel.

In FIG. 6 there is illustrated schematically apparatus for carrying out the inventive concepts of the instant application. The apparatus, as illustrated in FIG. 6, has the various components in a position similar to that position illustrated in FIG. 5. The mandrel 20 with the pipe 26 formed thereon is about to be removed from the pipe forming section while the new mandrel 22 has been positioned between the press rolls 8 and 10 and the anvil roll 2. Another mandrel 24 is ready for insertion, at the proper time, into the pipe forming section of the apparatus.

The apparatus for controlling the movement of the press rolls 8, 10 and 12 is centered about a fixed support 30. Suitable hydraulic means comprising a housing 32, cylinder 34 and rod 36 are secured to the support 30 and these hydraulic means control the movement of the press roll 10 in a direction toward and away from the anvil roll 2. The press roll 10 is journaled for rotation in a pair of ears 38 secured to the rod 36 by the base 40. Conventional hydraulic lines (not shown) are provided for moving the cylinder 34 within the housing 32 in a direction toward and away from the anvil roll 2.

The press roll 8 is journaled for rotation in a pair of ears 42 which are secured to the base 44 which is attached to a pair of pivoted arms 46. At the other end, the arms 46 are pivotally mounted at 48 to lugs 50 secured to the fixed support 30. The pivotal movement of the arms 46 is controlled by the hydraulic means 52 which is mounted on a base 54 which is pivotally connected to the arms 46 by a pivot means 56. The rod 58 of the hydraulic means 52 is pivotally connected by pivot means 60 to a base 62 secured to the fixed support 30. Suitable hydraulic lines (not shown) are provided for controlling the movement of the rod 58 into and out of the hydraulic means 52 to move the press roll 8 in an arcuate path toward and away from the anvil roll 2.

The press roll 12 is mounted by means similar to the mounting of press roll 8. The press roll 12 is journaled for rotation in a pair of ears 64 which are secured to the base 66 which is secured to a pair of pivoted arms 68. At the other end, the arms 68 are pivotally connected at 70 to lugs 72 secured to the fixed support 30. The pivotal movement of the arms 68 is controlled by the hydraulic means 74 which is mounted on a base 76 which is pivotally connected to the arms 68 by pivot means 78. The rod 80 is pivotally connected by pivot means 82 to a base 84 secured to the fixed support 30. Suitable hydraulic lines (not shown) are provided for controlling the movement of the rod 80 into and out of the hydraulic means 74 to move the press roll 12 in an arcuate path toward and away from the anvil roll 2.

The apparatus for moving an empty mandrel into position to be placed on the anvil roll 2, comprises a support 86 on which are mounted a plurality of rollers 88 on which the empty mandrels, such as mandrel 24, are supported. A pair of guide rails 90 are located adjacent to the rollers 88 with each guide rail 90 having a flange 92 over which the empty mandrels roll. On the other side of the rollers 88, there is located hydraulic means 94 having a head 96 with a plurality of rollers 98 secured thereto. This head is attached to a rod 100 which moves into and out of the hydraulic means 94. Conventional hydraulic lines (not shown) are provided for moving the rod 100. As the rod 100 moves out of hydraulic means 94, it pushes the mandrel 24 off the rollers 88 and over the flanges 92 of the rails 90. During the movement of the mandrel 24 over the flanges 92, the press roll 8 has been moved out of the path of the mandrel 24. A spring biased stop member 102 is located between the rails 90 and functions to hold the mandrel 24 in a desired position on the rails 92 which are inclined so that the mandrel waiting to be moved into position on the anvil roll 2 will abut against the stop member 102. As the mandrel 24 is moved over the rails 90, the weight of the mandrel depresses the stop member 102 which, after the mandrel has passed, springs back into position. The rod 100 is then retracted back into the hydraulic means to be in position to move the next mandrel that is supported on the rollers 88. The mandrel 24 rolls backward against the stop member 102 and is moved from this position by the press roll 8 as it is moved toward the anvil roll 2 by the hydraulic means 52. The mandrel 24 is then in a position to be moved by the press rolls 8, 10 and 12 in an arcuate path over the surface of the conveyor 4 as it moves around the anvil roll 2, as described above relative to FIGS. 1–5, inclusive, until it reaches the take-off means 104 comprising a pair of inclined rails 106 each having a flange 108 over which the mandrels with a pipe formed thereon can roll. The knife 110, which may be an air knife, a continuous sheet of metal or other means, extends from one rail 106 to the other rail in a direction parallel to the longitudinal axis of the anvil roll 2. The purpose of the knife 110 is to break the web of asbestos-cement extending between the laminations on the mandrel 20 and the asbestos-cement stock 6 on the felt 4. After the web has been broken, the surface of the pipe may be smoothed, if desired, by continued contact with the press roll 12 for one or more revolutions thereof.

In the foregoing explanation of the operation of the apparatus of the instant invention, it has been set out that the laminations of asbestos-cement on the mandrels has been accomplished while press rolls 8, 10 and 12 have been in contact with the laminations on the mandrel. In the preferred embodiment of the invention, the greater wall thickness of the laminations of asbestos-cement on the mandrel is accomplished when press rolls 10 and 12 contact such laminations. Moreover, in some instances it may be possible to eliminate the press roll 8 and have the pressure applied to the first few laminations of asbestos-cement only through press roll 10. In this type of operation, suitable means such as a pair of spaced rollers contacting the mandrel adjacent its axial extremities would be substituted for the press roll 8 so as to hold the mandrel in proper position and cooperate with press roll 10 and the anvil roll 2, in a manner as set forth above, during the movement of the mandrel through the system. The major portion of the laminations of asbestos-cement on the mandrel would be formed while these laminations were being contacted by the press rolls 10 and 12.

While the invention has been described in rather full detail, it will be understood that these details need not be strictly adhered to and that various changes and modifications may suggest themselves to one skilled in the art, all falling within the scope of the invention as defined by the subjoined claims.

What we claim is:

1. A method for manufacturing pipe comprising:
   (a) feeding a substantially continuous sheet of asbestos-cement to an anvil roll,
   (b) feeding a plurality of mandrels sequentially to a position wherein each of said mandrels is supported on said anvil roll,
   (c) moving each of said mandrels to a pipe forming position on said anvil roll with said asbestos-cement sheet passing between said anvil roll and each of said mandrels when in pipe forming position on said anvil roll,
   (d) rotating each of said mandrels to form a plurality of laminations of asbestos-cement thereon from said asbestos-cement sheet,
   (e) moving each of said mandrels into initial contact with a portion of said anvil roll having no portion of said asbestos-cement sheet thereon,
   (f) continuously rotating said anvil roll during the feeding of said plurality of mandrels,
   (g) applying pipe forming pressure on the laminations of abestos-cement on each of said mandrels during the formation of every one of said laminations on each of said mandrels,
   (h) sequentially removing each of said mandrels with a plurality of laminations formed thereon from the system, and
   (i) breaking the web of asbestos-cement extending between the laminations on each of said mandrels and the asbestos-cement sheet.

2. A method for manufacturing pipe comprising:
   (a) feeding a substantially continuous sheet of asbestos-cement to an anvil roll,
   (b) feeding a plurality of mandrels sequentially to a position wherein each of said mandrels is supported on said anvil roll,
   (c) moving each of said mandrels to a pipe forming position on said anvil roll with said asbestos-cement sheet passing between said anvil roll and each of said mandrels when in pipe forming position on said anvil roll,
   (d) rotating each of said mandrels to form a plurality of laminations of asbestos-cement thereon from said asbestos-cement sheet,
   (e) moving each of said mandrels into initial contact with a portion of said anvil roll having no portion of said asbestos-cement sheet thereon,
   (f) moving each of said mandrels while forming said laminations thereon through an arcuate distance in a direction opposite to the direction of rotation of said anvil roll,
   (g) continuously rotating said anvil roll during the feeding of said plurality of mandrels,
   (h) sequentially removing each of said mandrels with a plurality of laminations formed thereon from the system,
   (i) breaking the web of asbestos-cement extending between the laminations on each of said mandrels and the asbestos-cement sheet, and
   (j) applying pipe forming pressure to the laminations of abestos-cement on each of said mandrels during said movement of each of said mandrels through said arcuate distance.

3. A method for manufacturing pipe comprising:
   (a) training an endless conveyor carrying a substantially continuous asbestos-cement sheet thereon for movement around an anvil roll,
   (b) feeding a plurality of mandrels sequentially to a position wherein each of said mandrels is supported on said anvil roll in contact with said endless conveyor as it moves around said anvil roll,
   (c) moving each of said mandrels to a pipe forming position wherein said endless conveyor passes between said anvil roll and each of said mandrels,
   (d) rotating each of said mandrels to form a plurality of laminations of asbestos-cement thereon from the asbestos-cement sheet carried by said endless conveyor.
   (e) moving each of said mandrels into initial contact with a portion of said endless conveyor having no portion of said asbestos-cement sheet thereon,
   (f) continuously moving said endless conveyor during the feeding of said plurality of mandrels, and
   (g) applying pipe forming pressure on the laminations of asbestos-cement on each of said mandrels during the formation of every one of said laminations on each of said mandrels,
   (h) breaking the web of asbestos-cement extending between the laminations on each of said mandrels and said asbestos-cement sheet on said conveyor.

4. A method for manufacturing pipe comprising:
   (a) training an endless conveyor carrying a substantially continuous asbestos-cement sheet thereon for movement around an anvil roll,
   (b) feeding a plurality of mandrels sequentially to a position wherein each of said mandrels is supported on said anvil roll in contact with said endless conveyor as it moves around said anvil roll,
   (c) moving each of said mandrels to a pipe forming position wherein said endless conveyor passes between said anvil roll and each of said mandrels,
   (d) rotating each of said mandrels to form a plurality of laminations of asbestos-cement thereon from the asbestos-cement sheet carried by said endless conveyor,
   (e) moving each of said mandrels into initial contact with a portion of said endless conveyor having no portion of said asbestos-cement sheet thereon,
   (f) moving each of said mandrels while forming said laminations thereon through an arcuate distance in a direction opposite to the direction of movement of said endless conveyor,
   (g) continuously moving said endless conveyor during the feeding of said plurality of mandrels,
   (h) sequentially removing each of said mandrels with a plurality of laminations formed thereon from the system,
   (i) breaking the web of asbestos-cement extending between the laminations on each of said mandrels and said asbestos-cement sheet on said conveyor, and
   (j) applying pipe forming pressure to the laminations of asbestos-cement on each of said mandrels during said movement of each of said mandrels through said arcuate distance.

5. A method for manufacturing pipe comprising:
   (a) training an endless conveyor carrying asbestos-cement stock thereon for movement around an anvil roll,
   (b) supporting a first mandrel on said anvil roll with said endless conveyor passing between said first mandrel and said anvil roll,
   (c) moving said endless conveyor so that said asbestos-cement stock thereon moves into contact with said first mandrel,
(d) rotating said first mandrel to laminate a plurality of layers of said asbestos-cement thereon,
(e) applying pipe forming pressure on the laminations of asbestos-cement on said first mandrel during the formation of every one of said laminations on said mandrel,
(f) supporting a second mandrel on said anvil roll and on a portion of said endless conveyor containing no portion of said asbestos-cement stock thereon,
(g) moving said first mandrel out of its position on said anvil roll and breaking the web of asbestos-cement extending between the laminations on said first mandrel and said asbestos-cement sheet on said conveyor,
(h) moving said asbestos-cement stock on said endless conveyor into contact with said second mandrel, and
(i) repeating said steps applied to said first and second mandrels with a plurality of other mandrels.

6. A method for manufacturing pipe comprising:
(a) training an endless conveyor carrying asbestos-cement stock thereon for movement around an anvil roll,
(b) supporting a first mandrel on said anvil roll with said endless conveyor passing between said first mandrel and said anvil roll,
(c) moving said endless conveyor so that said asbestos-cement stock thereon moves into contact with said first mandrel,
(d) rotating said first mandrel to laminate a plurality of layers of said asbestos-cement thereon,
(e) applying pipe forming pressure on the laminations of asbestos-cement on said first mandrel during the formation of every one of said laminations on said first mandrel,
(f) moving said first mandrel while forming said laminations thereon and while supported by said anvil roll through an arcuate distance in a direction opposite to the direction of movement of said endless conveyor,
(g) supporting a second mandrel on said anvil roll and on a portion of said endless conveyor containing no portion of said asbestos-cement stock thereon,
(h) moving said first mandrel out of its position on said anvil roll and breaking the web of asbestos-cement extending between the laminations on said first mandrel and said asbestos-cement sheet on said conveyor, and
(i) moving said asbestos-cement stock on said endless conveyor into contact with said second mandrel.

7. Apparatus for manufacturing pipe comprising:
(a) an anvil roll,
(b) an endless conveyor carrying an asbestos-cement sheet thereon trained around said anvil roll,
(c) means for feeding a plurality of mandrels sequentially to a position wherein each of said mandrels is supported on said anvil roll with said endless conveyor passing between said anvil roll and each of said mandrels,
(d) means for moving said endless conveyor to move said asbestos-cement sheet thereon sequentially into contact with each of said mandrels,
(e) means for rotating each of said mandrels to wind said asbestos-cement sheet around said mandrel to form a plurality of laminations thereon,
(f) means for moving each of said mandrels through an arcuate distance in a direction opposite to the direction of movement of said endless conveyor while forming said laminations thereon,
(g) means for sequentially moving each of said mandrels out of contact with said endless conveyor,
(h) means for severing the web of asbestos-cement extending between the laminations on said mandrel and the asbestos-cement sheet on said conveyor,
(i) means for continuously moving said endless conveyor during the formation of said laminations of asbestos-cement on said mandrels, and
(j) means for applying pipe forming pressure on said laminations of asbestos-cement on each of said mandrels during the movement of each of said mandrels through said arcuate distance.

8. Apparatus for manufacturing pipe comprising:
(a) an anvil roll,
(b) an endless conveyor carrying an asbestos-cement sheet thereon trained around said anvil roll,
(c) a plurality of mandrels,
(d) means for feeding a first mandrel to a position supported on said anvil roll with said mandrel in contact with the surface of said endless conveyor and said endless conveyor passing between said anvil roll and said mandrel,
(e) means for moving said asbestos-cement sheet into contact with the peripheral surface of said first mandrel,
(f) means for rotating said first mandrel to wind said asbestos-cement sheet around said mandrel to form a plurality of laminations thereon,
(g) means for moving said first mandrel through an arcuate distance in a direction opposite to the direction of movement of said endless conveyor,
(h) means for moving a second mandrel into a position wherein said second mandrel is supported on said anvil roll and in contact with a portion of said endless conveyor having no asbestos-cement thereon while forming said laminations on said first mandrel,
(i) means for severing the web of asbestos-cement extending between the laminations on said first mandrel and the asbestos-cement sheet on said endless conveyor and for moving said first mandrel with said laminations thereon out of contact with said asbestos-cement sheet on said endless conveyor,
(j) means for continuing the movement of said endless conveyor to move said asbestos-cement sheet into contact with the peripheral surface of said second mandrel, and
(k) means for applying pipe forming pressure on said laminations of asbestos-cement on each of said mandrels during the movement of each of said mandrels through said arcuate distance.

9. Apparatus as defined in claim 8 wherein:
(l) said means for applying pressure on said lamination of asbestos-cement on said mandrels comprises a plurality of rotatable and movable press rolls.

References Cited

FOREIGN PATENTS 204,430  11/1956  Australia.

OTHER REFERENCES

Toniolo: German application No. 1,062,606, published July 1959, class 25–30A.

ROBERT F. WHITE, *Primary Examiner.*

J. A. FINLAYSON, *Assistant Examiner.*